(12) United States Patent
Yamada

(10) Patent No.: US 11,137,892 B2
(45) Date of Patent: Oct. 5, 2021

(54) INFORMATION PROVIDING APPARATUS, INFORMATION PROVIDING METHOD, NON-TRANSITORY RECORDING MEDIUM RECORDED WITH INFORMATION PROVIDING PROGRAM, AND NON-TRANSITORY RECORDING MEDIUM RECORDED WITH USER TERMINAL CONTROL PROGRAM

(71) Applicant: GURUNAVI, INC., Tokyo (JP)

(72) Inventor: Atsushi Yamada, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 0 days.

(21) Appl. No.: 16/962,317

(22) PCT Filed: Jan. 9, 2019

(86) PCT No.: PCT/IB2019/050167
§ 371 (c)(1),
(2) Date: Jul. 15, 2020

(87) PCT Pub. No.: WO2019/142074
PCT Pub. Date: Jul. 25, 2019

(65) Prior Publication Data
US 2020/0341609 A1     Oct. 29, 2020

(30) Foreign Application Priority Data
Jan. 17, 2018 (JP) .............................. JP2018-006002

(51) Int. Cl.
*G06F 3/048*     (2013.01)
*G06F 3/0485*     (2013.01)
(Continued)

(52) U.S. Cl.
CPC .......... *G06F 3/0485* (2013.01); *G06F 3/0482* (2013.01); *G06F 3/0488* (2013.01); *G06F 3/04842* (2013.01)

(58) Field of Classification Search
CPC ..... G06F 3/0482; G06F 3/0485; G06F 3/0488
See application file for complete search history.

(56) References Cited

U.S. PATENT DOCUMENTS

2002/0135621 A1*   9/2002   Angiulo ................ G06F 16/958
                                                                              715/838
2005/0278738 A1   12/2005   Kaneko et al.
(Continued)

FOREIGN PATENT DOCUMENTS

CN          102129453 A     7/2011
JP          2005-327000 A     11/2005
(Continued)

OTHER PUBLICATIONS

Office Action dated Jan. 22, 2019 in Japanese Application No. 2018-006002.
(Continued)

*Primary Examiner* — Claudia Dragoescu
(74) *Attorney, Agent, or Firm* — Sughrue Mion, PLLC

(57) ABSTRACT

An information providing apparatus includes an information storage unit configured to store a plurality of pieces of information concerning objects, a first display data providing unit configured to provide first display data for arranging and displaying a plurality of display regions on a display screen of a user terminal in a predetermined display shape respectively in correspondence with a plurality of objects such that a part of the information stored in the information storage unit is displayed in the plurality of display regions, a switching instruction acquiring unit configured to acquire a switching instruction from the user terminal in response to a first operation performed on the display regions displayed (Continued)

on the display screen, and an information switching unit configured to, when the switching instruction acquiring unit has acquired the switching instruction, switch information displayed in the display regions based on the first display data.

18 Claims, 7 Drawing Sheets

(51) Int. Cl.
*G06F 3/0482* (2013.01)
*G06F 3/0484* (2013.01)
*G06F 3/0488* (2013.01)

(56) References Cited

U.S. PATENT DOCUMENTS

| | | |
|---|---|---|
| 2011/0283236 A1 | 11/2011 | Beaumier et al. |
| 2013/0036382 A1 | 2/2013 | Yuan et al. |
| 2014/0250147 A1 | 9/2014 | Shapira et al. |
| 2015/0074097 A1 | 3/2015 | Lavine |
| 2015/0113443 A1* | 4/2015 | Breger .................. G06Q 50/00 715/753 |
| 2016/0078374 A1 | 3/2016 | Lippow et al. |
| 2017/0097967 A1* | 4/2017 | Savliwala .............. G06Q 30/02 |

FOREIGN PATENT DOCUMENTS

| | | |
|---|---|---|
| JP | 2013-109593 A | 6/2013 |
| JP | 2014-29588 A | 2/2014 |

OTHER PUBLICATIONS

User Guide: Orbit, the Questel IP Portal, Mar. 2012, pp. 1-94.
International Search Report for PCT/IB2019/050167 dated May 2, 2019 [PCT/ISA/210].
Written Opinion for PCT/IB2019/050167 dated May 2, 2019 [PCT/ISA/237].

* cited by examiner

INFORMATION PROVIDING APPARATUS, INFORMATION PROVIDING METHOD, NON-TRANSITORY RECORDING MEDIUM RECORDED WITH INFORMATION PROVIDING PROGRAM, AND NON-TRANSITORY RECORDING MEDIUM RECORDED WITH USER TERMINAL CONTROL PROGRAM

CROSS REFERENCE TO RELATED APPLICATIONS

This application is a National Stage of International Application No. PCT/IB2019/050167 filed Jan. 9, 2019, claiming priority based on Japanese Patent Application No. 2018-006002 filed Jan. 17, 2018, the entire contents of each of which are herein incorporated by reference.

BACKGROUND OF THE INVENTION

1. Field of the Invention

The present invention relates to an information providing apparatus, an information providing method, a non-transitory recording medium recorded with an information providing program, and a non-transitory recording medium recorded with a user terminal control program.

2. Description of Related Art

There is known an apparatus that searches for a transaction target(s) such as a sale item or a shop, and displays a list of search results. The display format of the list, such as the number of transaction targets displayed in the list, the size of photographs, and presence/absence of an explanation text, can be changed by a user operation. In addition, the user can select a transaction target from the list to display detailed information of the selected transaction target. For example, Japanese Patent Application Publication No. 2014-029588 discloses such a technology.

However, according to the above-mentioned technology, when the user wants to confirm a particular piece of information (e.g., a shipping charge or a delivery time) among detailed information of a plurality of objects (including transaction targets), the user needs to display detailed information of an object from the list, then display the list again, and display detailed information of another object. Accordingly, the user may need to perform operations many times, and the operations may be troublesome to the user.

In addition, when the user changes the display format of the list, the number of objects displayed in the list or the layout of the list may be changed. This may cause the user to feel difficulty in confirming the information of the objects. In addition, even if the display format of the list is changed by the operation of the user, information of an object that the user wants to confirm may not be displayed in the list.

SUMMARY OF THE INVENTION

The present invention provides an information providing apparatus, an information providing method, a non-transitory recording medium recorded with an information providing program, and a non-transitory recording medium recorded with a user terminal control program which allow users to easily confirm information of a desired object.

A first aspect of the present invention relates to an information providing apparatus including an information storage unit configured to store a plurality of pieces of information concerning objects, a first display data providing unit configured to provide first display data for arranging and displaying a plurality of display regions on a display screen of a user terminal in a predetermined display shape respectively in correspondence with a plurality of objects such that a part of the information stored in the information storage unit is displayed in the plurality of display regions, a switching instruction acquiring unit configured to acquire a switching instruction from the user terminal in response to a first operation performed on the display regions displayed on the display screen, and an information switching unit configured to, when the switching instruction acquiring unit has acquired the switching instruction, switch information displayed in the display regions based on the first display data.

In the above aspect, the switching instruction acquiring unit may acquire the switching instruction by recognizing, as the first operation, a scroll operation performed on the display regions displayed on the display screen.

In the above aspect, the switching instruction acquiring unit may acquire the switching instruction by recognizing, as the first operation, a swipe operation performed on the display regions displayed on the display screen.

In the above aspect, the information switching unit may switch information displayed in a display region in which the first operation has been performed, among the plurality of arranged display regions.

In the above aspect, the first display data providing unit may provide the first display data for dividing each of the display regions into a plurality of sub regions for display, and the information switching unit may switch the information displayed in the display regions based on a sub region in which the first operation has been performed.

In the above aspect, the information providing apparatus may further include a second display data providing unit configured to provide second display data for displaying detailed information of an object corresponding to a display region in which a second operation has been performed. When the second operation is performed in the display region among the plurality of display regions displayed on the display screen, the second display data providing unit may provide the second display data for displaying detailed information of the object corresponding to the display region in which the second operation has been performed.

In the above aspect, the information switching unit may switch a type of information displayed in the display regions while maintaining a shape of each of the display regions.

In the above aspect, the information switching unit may switch the type of information displayed in the display regions while maintaining to display the display regions on the display screen.

In the above aspect, the information switching unit may change a shape of each of the display regions displayed on the display screen of the user terminal while fixing a position of a part of each of the display regions, and switches the type of information displayed in the display regions.

In the above aspect, the information switching unit may change a shape of each of the display regions that are scrollably displayed on the display screen of the user terminal, while fixing a scroll position on the display regions, and switches the type of information displayed in the display regions.

In the above aspect, the information switching unit may notify the user terminal that not all of information available is displayed in the display regions.

A second aspect of the present invention relates to an information providing method including storing a plurality of pieces of information concerning objects, providing first display data for arranging and displaying a plurality of display regions on a display screen of a user terminal in a predetermined display shape respectively in correspondence with a plurality of objects such that a part of the stored information is displayed in the plurality of display regions, acquiring a switching instruction from the user terminal in response to a first operation performed on the display regions displayed on the display screen, and when the switching instruction has been acquired, switching information displayed in the display regions based on the first display data.

A third aspect of the present invention relates to a non-transitory recording medium recorded with an information providing program designed to function a computer. The information providing program includes a function to store a plurality of pieces of information concerning objects, a function to provide first display data for arranging and displaying a plurality of display regions on a display screen of a user terminal in a predetermined display shape respectively in correspondence with a plurality of objects such that a part of the stored information is displayed in the plurality of display regions, a function to acquire a switching instruction from the user terminal in response to a first operation performed on the display regions displayed on the display screen, and a function to, when the switching instruction has been acquired, switch information displayed in the display regions based on the first display data.

A fourth aspect of the present invention relates to a non-transitory recording medium recorded with a user terminal control program designed to function a computer. The user terminal control program includes a first display data acquiring function to acquire, from an information providing apparatus, first display data for displaying a plurality of display regions in a predetermined display shape respectively in correspondence with a plurality of objects such that a part of a plurality of pieces of information concerning the objects is displayed in the plurality of display regions, a first display data displaying function to arrange and display the plurality of display regions on a display screen based on the acquired first display data, and a switching instruction providing function to provide the information providing apparatus with a switching instruction instructing to switch information displayed in the display regions in response to a first operation performed on the display regions displayed on the display screen.

The above aspects provide an information providing apparatus, an information providing method, a non-transitory recording medium recorded with an information providing program, and a non-transitory recording medium recorded with a user terminal control program which allow users to easily confirm information of a desired object.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes, in detail, an information providing apparatus, an information providing method, a non-transitory recording medium recorded with an information providing program, and a non-transitory recording medium recorded with a user terminal control program according to an embodiment of the present invention with reference to the accompanying drawings.

Figure 1:
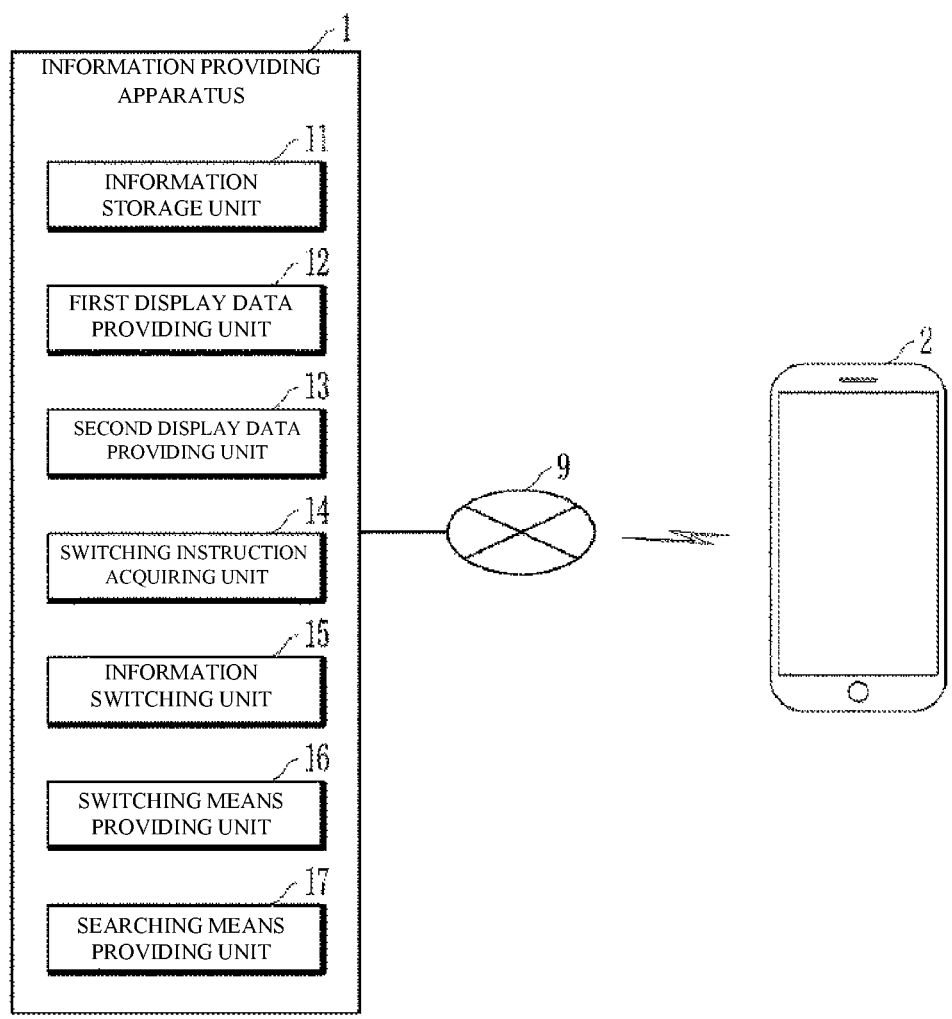
FIG. 1 is a block diagram showing an example of a software configuration of an information providing apparatus according to an embodiment.

First, with reference to FIG. 1, a software configuration of the information providing apparatus is described. FIG. 1 is a block diagram showing an example of the software configuration of the information providing apparatus according to the embodiment.

In FIG. 1, an information providing apparatus 1 has functions of an information storage unit 11, a first display data providing unit 12, a second display data providing unit 13, a switching instruction acquiring unit 14, an information switching unit 15, a switching means providing unit 16, and a searching means providing unit 17. The present embodiment is described on the assumption that the above-mentioned functions of the information providing apparatus 1 are function modules realized by an information providing program (software) that controls the information providing apparatus 1.

The information providing apparatus 1 is configured to provide a user terminal 2 with a plurality of types of information concerning objects. The term "objects" refers to a plurality of targets that may be displayed in a list. Each object has a plurality of types of information. The objects may be, for example, stores, commercial products, hotels, or services. For example, in a case where the objects are restaurants, information concerning the objects may be a store name, a photograph, a nearest station, an average budget, a special feature of the store, latest information, the number of chairs, presence/absence of private rooms, availability of a room buyout, availability of credit card use, availability of smoking, and reservable courses, for each of the restaurants. In addition, "types" in "a plurality of types of information concerning objects" refers to "types" in a plurality of types of information concerning objects like the above-described ones. One object may include a plurality of types of information. In a case where the objects are commercial products, information concerning the objects may be a seller, a product name, a delivery time, and/or an evaluation (the number of stars), for each of the commercial products. Furthermore, in a case where the objects are hotels, information concerning the objects may be a hotel name, a nearest station, an evaluation (the number of stars), availability of free Wi-Fi, accommodation plans, and/or hotel charges, for each of the hotels. In the present embodiment, descriptions are given on the assumption that the objects are restaurants. It is noted that, in the embodiment of the present invention, the objects are not limited to restaurants or hotels, but may be other types of facilities or products.

The information providing apparatus 1 is configured to provide the user terminal 2 with display data for displaying a list of stores that are displayed as specific examples of the objects. The user terminal 2 is, for example, a desk top PC, a note PC, a tablet PC, or a smartphone. FIG. 1 shows a smartphone as an example of the user terminal 2. The information providing apparatus 1, for example, provides the user terminal 2 with display data for allowing a user to search for a store, and provides the user terminal 2 with display data for displaying a list of a plurality of stores resulted from a search by the user. It is noted that processes executed by the user terminal 2 as described below are realized when the user terminal 2 executes a user terminal control program that causes the user terminal 2 to execute various processes. It is noted that the present invention may be embodied as a recording medium recorded with the user terminal control program.

The information providing apparatus 1 is connected to the user terminal 2 such that it can communicate with the user terminal 2 via a network 9 in wired or wireless communication. The network 9 may include a communication facility (not shown) such as a base station of mobile phones. In addition, the information providing apparatus 1 may communicate with a plurality of user terminals 2.

The information storage unit 11 stores a plurality of pieces of information concerning objects. For example, the information storage unit 11 stores, with respect to each of the stores, a store name, a photograph, a nearest station, an average budget, a special feature of the store, latest information, the number of chairs, presence/absence of private rooms, availability of a room buyout, availability of credit card use, availability of smoking, and reservable courses, as described above. The information storage unit 11 stores arbitrary information associated with the objects. For example, the information storage unit 11 stores, as the information associated with the objects, the number of types of information, the amount of information, and data formats (text data, image data, etc.).

The first display data providing unit 12 provides first display data for arranging and displaying a plurality of display regions on a display screen of the user terminal 2 in a predetermined display shape respectively in correspondence with a plurality of objects such that a part of information stored in the information storage unit 11 is displayed in the plurality of display regions. In the present embodiment, the display regions are a plurality of operation targets arranged on the display screen of the user terminal 2. A plurality of display regions are arranged on the display screen of the user terminal 2, and displayed as a list. That is, the display regions are display units in which the objects are displayed as a list, and the display regions are operation units in which the objects are operated. Details of the operations that can be performed on the display regions are described below.

The display regions have a predetermined display format. The display format includes, for example, a size (the number of dots) of the display region corresponding to the resolution of the display screen of the user terminal 2, a shape of the display region, a type of information displayed in the display region, a layout, a data format, and/or a character font. In each of the display regions, information of an object is displayed. The display regions may be display units in which objects are displayed (published) on a Web page, and may be called "cassettes". The first display data is used to arrange and display a plurality of display regions (as a list) on the display screen of the user terminal 2. The first display data providing unit 12 provides the user terminal 2 with the first display data, thereby enabling the user terminal 2 to display a list of information of a plurality of objects such that the user can select an operation-target object from the plurality of objects.

The first display data providing unit 12 may provide the first display data for dividing each display region into a plurality of sub regions for display. That is, the first display data providing unit 12 has a function to generate the display regions which are each a group of multiple sub regions. The sub regions may be arbitrarily set for the display regions. For example, the first display data providing unit 12 provides the first display data that associates each type of information displayed in a display region with a sub region. Alternatively, the first display data providing unit 12 may provide the first display data that associates a plurality of types of information displayed in a display region with a sub region. The sub regions, like the display regions, may be set as operation units. For example, the first display data providing unit 12 provides the user terminal 2 with the first display data for displaying display regions that each include a plurality of sub regions such that the user can select information associated with a sub region from among the plurality of sub regions.

The first display data may be displayed as a plurality of display regions in such a manner that they can be scrolled sequentially. Here, scrolling refers to moving display data displayed on the display screen of the user terminal 2 gradually in a vertical (upward or downward) or horizontal (leftward or rightward) direction so as to display a part of display data that is not settled within the display screen of the user terminal 2 and not displayed on the display screen. For example, in a case where the user terminal 2 has a display screen on which five display regions can be displayed at once, the user can display (browse) one or more display regions other than the five display regions by scrolling the displayed list.

The second display data providing unit 13 is configured to, when the user selects one of the display regions displayed on the display screen of the user terminal 2 by performing a second operation, provide second display data so that detailed information of an object corresponding to the selected display region is displayed. The second operation is, for example, a tapping operation of tapping a display region. A plurality of display regions are displayed on the display screen of the user terminal 2 based on the first display data. When the user selects a display region from the plurality of display regions on display by tapping the display region, the second display data providing unit 13 displays detailed information of an object corresponding to the tapped display region by causing information to be displayed based on the second display data.

The detailed information of an object may include a part or all of the information stored in the information storage unit 11, or another piece of information. That is, information included in the first display data and information included in the second display data may be independent of each other. This allows the user to confirm details of the object based on the second display data.

In a case where the objects are restaurants, information of one store is displayed in one cassette (an example of the display region). A part of information of the store, such as a store name, a photograph, a nearest station, and a special feature of the store, is displayed in each cassette. A list of cassettes of a plurality of stores is displayed on the display screen of the user terminal 2 based on the first display data. The first display data may be generated based on a result of search that is performed by the user with a predetermined search condition. When the user performs the second operation on a cassette among a plurality of cassettes displayed in a list, detailed information of a store of the cassette on which the second operation was performed is displayed on the display screen of the user terminal 2 based on the second display data. The detailed information of the store may include information of the store displayed in a cassette, or may be information independent of the information of the store displayed in the cassette, such as information of a homepage of the store.

<First Object Comparison Method>

The first object comparison method provides a comparison among a plurality of objects by switching between displaying a list of a plurality of display regions of objects based on the first display data and displaying detailed information of an object based on the second display data. The first object comparison method can be used when information necessary for determining an object cannot be obtained from the displayed list of display regions.

The following describes an example of how to use the first object comparison method to make a comparison among restaurants. When a user makes a comparison among restaurants, the user would confirm access from a certain railroad station, locational information, contents of party courses, availability of reservation, for example. When the user cannot obtain, from the information displayed in the cassettes, information on which the user would like to confirm for comparison among the restaurants, the user selects, by performing the second operation, a cassette of a store from a list of cassettes to display detailed information of the store and obtain desired information from the displayed detailed information. The first object comparison method allows the user to make a comparison among a plurality of stores by switching, a plurality of times, between displaying a list of cassettes and displaying detailed information of a store.

<Second Object Comparison Method>

The second object comparison method allows for a comparison among a plurality of objects by displaying a part or all of information on which the user would like to confirm to determine an object, by switching information displayed in the display regions of objects based on the first display data. The switching of information displayed in the display regions may be switching to the same type of information, or to a different type of information. The switching to the same type of information is, for example in a case of information on access to the store, switching from information of the nearest station (simple information) to information including a route(s) from the nearest station (detailed information). In addition, the switching to a different type of information is, for example, switching from information on access to the store to information on course meals.

The switching instruction acquiring unit 14 is configured to acquire a first switching instruction from the user terminal 2, wherein the first switching instruction is provided from the user terminal 2 when a first operation is performed on a display region displayed on the display screen of the user terminal 2. When the switching instruction acquiring unit 14 has acquired the first switching instruction, the information switching unit 15 switches information displayed in the display regions based on the first display data. The following describes examples of execution modes of the first operation.

[Scroll Operation on Display Regions]

The scroll operation on the display regions refers to moving information displayed on a display region or a sub region gradually upward or downward, or leftward or rightward so as to display a part of the information that is not settled within and not displayed on the display screen. The user can switch information displayed on a display region or a sub region to another one by performing the scroll operation to the end of the part of the information that had not been displayed, and further continuing the scroll operation. For example, in a case where the object is a restaurant, the user may perform the scroll operation on information of a course meal displayed in a sub region of a display region until the end of the information is displayed, and may further continue the scroll operation so as to switch the information to information of the next course meal. The user may perform the scroll operation in the reverse direction to as to return the information displayed in the sub region or the display region to previously displayed information. That is, the scroll operation may be performed to instruct to switch information in accordance with the scroll direction. The switching instruction acquiring unit 14 acquires the switching instruction by recognizing, as the first operation, the scroll operation performed on a display region (including a sub region) displayed on the display screen.

[Swipe Operation on Display Regions]

The swipe operation on the display regions refers to an operation of sliding a finger (including a touch pen or the like) in a state where the finger is in touch with a display region or a sub region displayed on the display screen of the user terminal 2. By performing the swipe operation, the user can switch information displayed in a display region or a sub region. For example, in a case where the object is a restaurant, the user may swipe information of a course meal displayed in a sub region so as to switch the information to information of the next course meal. It is noted that since a sub region is a part of a display region, an operation onto the sub region may be distinguished from an operation onto the display region. For example, when the user touches a sub region in a state where the swipe operation can be performed on the sub region, the switching instruction acquiring unit 14 determines the sub region as the operation target. On the other hand, when the user stops a finger for a predetermined time period or more while the finger is in touch with a sub region, the switching instruction acquiring unit 14 determines the display region as the operation target. When the operation target is a sub region, the user terminal 2 may change the display color or the like of the sub region, and when the operation target is a display region, the user terminal 2 may change the display color or the like of the display region. With such a configuration, the user can visually recognize the operation target. As is the case with the scroll operation, the user may perform the swipe operation in the reverse direction so as to return the information displayed in the sub region or the display region to previously displayed information.

The following describes some execution modes for switching information displayed in a display region in response to the first operation. The execution modes described below may be implemented independently of each other, or may be implemented at the same time. In addition, one execution mode may include another execution mode.

[Execution Mode to Switch Information in Display Region Upon Performance of First Operation Therein]

In the execution mode to switch information in display region upon performance of first operation therein, the information switching unit 15 switches information in a sub region or a display region in which the sub region is included, upon performance of the first operation in the sub region. For example, in a case where a light display regions are displayed on the display screen of the user terminal 2, and each of the display regions includes a plurality of sub regions, the information switching unit 15 switches information only in a sub region in which the user has performed the swipe operation. Alternatively, in a display region that includes a sub region in which the user has performed the swipe operation, the information switching unit 15 may switch information in another sub region. For example, in a case where the object is a restaurant, the information switching unit 15 switches information in a restaurant when the user performs the first operation in a display region of the restaurant. When the user switches information displayed in a sub region to information of a course meal by performing the first operation, the information switching unit 15 may switch information in other sub regions of the store to information of a coupon that can be used for the course meal, or information including word-of-mouth information on the course meal. The present execution mode improves usability of the user by allowing the user to switch to information the user wants to confirm concerning an object the user wants to confirm.

[Execution Mode to Switch Information Based on Sub Region in which First Operation has been Performed]

In the execution mode to switch information based on a sub region in which the first operation has been performed, information displayed in a sub region in which the first operation has been performed, or the same type of information displayed in other sub regions of different display regions, is switched. For example, in a case where a plurality of display regions are displayed on the display screen of the user terminal 2 and each of the display regions includes a plurality of sub regions, the information switching unit 15 switches information only in a sub region in which the user has performed the swipe operation. Alternatively, the information switching unit 15 may switch the same type of information displayed in other sub regions of different display regions as the type of information displayed in the sub region in which the user has performed the swipe operation. For example, in a case where the object is a restaurant, when the user performs the first operation in a sub region of a store, the information switching unit 15 switches the same type of information in other sub regions of a plurality of stores. When the user performs the first operation to switch information displayed in a sub region to information of a distance from the nearest station, the information switching unit 15 may switch the same type of information in other sub regions of other stores to information of a distance from the nearest station. The present execution mode improves usability of the user by allowing the user to switch information of a plurality of objects based on a type of information the user wants to confirm.

[Execution Mode to Maintain Shape of Display Region]

In an execution mode to maintain shape of display region, a part or all of information of an object displayed in a display region is switched to another information of the object while the shape of the display region is maintained. Examples of the shape of the display region include a quadrangle, a rounded corner quadrangle, a circle, and an oval. According to the present embodiment, it is possible to easily switch information displayed in the display region as desired for confirmation while maintaining the positional relationship among a plurality of display regions (objects), by switching information displayed in a display region while maintaining the shape of the display region based on the first display data. This increases the usability of users.

[Execution Mode to Change Shape of Display Region]

In an execution mode to change shape of display region, a part or all of information of an object displayed in a display region is switched to another information of the object, and the shape of the display region is changed while a position of a part of the display region currently displayed on the display screen of the user terminal is fixed. Fixing a position of a part of the display region currently displayed is, for example, to fix a position of a point or a line in the display region currently displayed on the display screen of the user terminal while changing the shape of the display region. Fixing a position of a point or a line in a display region while changing the shape of the display region is, for example, to expand, shrink, or deform (hereinafter, "to expand, shrink, or deform" may be referred to as "to expand or the like") the display region without changing a display position of a point in the display region. Fixing a position of a point or a line in a display region while changing the shape of the display region may be to expand or the like the display region centered on a display position of a point in the display region.

For easy confirmation of contents of information of the objects in the display regions, various elements such as the size, number of, or display positions of characters, the size of images, the layout of information and so on are taken into account. As a result, for some types of information of objects, changing the shape of the display regions currently displayed may lead to easier confirmation of information. For example, information including a lot of characters, information including a photograph, and information including a map may become easier to see if the display regions are larger. On the other hand, for example, information on availability of reservation (for example, Y or N) may be sufficiently easy to see even if the display regions are small. In a case where the shape of the display regions is changed in correspondence with the type of information, the display positions of the display regions in the display screen may change. The display position of a display region in the display screen is, for example, a scroll position of the display region in a displayed list. In a case where the display regions are scrollably displayed based on the first display data, if the shape of the display regions is changed, a currently displayed display region may be shifted in position or disappear from the display screen. In that case, it becomes difficult for the user to find a display region up to which the user has browsed (scrolled). In view of this, the information switching unit 15 is configured to fix a position of a part of each display region currently displayed on the display screen when switching from a part or all of information of the objects in the display regions, to another information of the objects. This facilitates the user to find a display region up to which the user has browsed, increasing the usability of the user.

In addition, regardless of whether or not the shape of display regions is changed, the information switching unit 15 may switch a type of information displayed in the display regions to another type of information while maintaining to display the display regions on the display screen. In a case where the information switching unit 15 maintains to display the display regions on the display screen, the user who has switched from a type of information to another type of information can visually recognize the display region that the user is currently browsing. Accordingly, this increases the usability of the user. It is noted that maintaining to display the display regions on the display screen is to keep displaying, on the display screen, the display regions in which the user has switched from a type of information to another type of information. This is not to maintain the contents of information (not change the information) displayed in the display regions. In addition, as far as the display regions on the display screen are maintained to be displayed, the positions of the display regions in the display screen may be moved. For example, in a case where a cassette of store A and a cassette of store B are displayed on the display screen of the user terminal 2, when a type of information displayed in the cassette of store B is switched to another type of information in accordance with a switching instruction from the user, the display position of the cassette of store B may be moved to a position where the cassette of store A had been displayed.

Since the information providing apparatus 1 of the present embodiment provides the second object comparison method as well as the first object comparison method, it provides the user with a wide range of object comparison methods. For example, in a case where information on which the user wants to confirm is displayed in the display regions, the user may use the second object comparison method to make a comparison among objects while displaying the list of display regions. Furthermore, in a case where information on which the user wants to confirm includes information that cannot be displayed in the display region, the user may use the first object comparison method to make a comparison among objects by displaying detailed information of an object. The information providing apparatus 1 may be configured to execute either of the first object comparison method or the second object comparison method, or may be configured to execute both methods.

In the present embodiment, the term "acquire" means both cases where: an entity from whom information is acquired initiatively transmits the information to an entity who acquires the information; and the entity who acquires the information initiatively receives the information from the entity from whom the information is acquired. In addition, in the present embodiment, the term "provide" means both cases where: an entity who provides information initiatively transmits the information to an entity who is provided with the information; and the entity who is provided with the information initiatively receives the information from the entity who provides the information. That is, the terms "acquire" and "provide" indicate directions in which information flows, not limiting the subjects of transmission and reception.

In the second object comparison method, the user performs the first operation on the user terminal 2 to provide the switching instruction acquiring unit 14 with a switching instruction that instructs to switch information displayed in the display region based on the first display data. That is, the user can easily make a comparison among a plurality of objects by displaying, in the display region, a part or all of information on which the user wants to confirm for the comparison among the objects.

Next, a description is given of a case where the second object comparison method is used to, for example, make a comparison among restaurants. When a user wants to confirm the access from a railroad station, the user performs the first operation on the user terminal 2 to cause the user terminal 2 to provide the information providing apparatus 1 with a switching instruction that instructs to display, in the display region, information of the access from a railroad station. Similarly, when a user would like to confirm contents of party courses, the user performs the first operation on the user terminal 2 to cause the user terminal 2 to provide the information providing apparatus 1 with a switching instruction that instructs to display, in the display region, information of contents of party courses.

As described above, a plurality of display regions are displayed on the display screen of the user terminal 2 based on the first display data. As a result, the size of each display region may be restricted, and the amount of information that can be displayed in each display region may be restricted. The information providing apparatus 1 may have a notification function such that when it is expected that an amount of information displayed in each display region would exceed the upper-limit if a type of information currently displayed in the display regions were switched to another in accordance with a switching instruction, the information providing apparatus 1 notifies the user terminal 2 that the type of information cannot be switched. In addition, the information providing apparatus 1 may have a notification function such that when it is expected that an amount of information displayed in each display region would exceed the upper-limit if a type of information currently displayed in the display regions were switched to another in accordance with a switching instruction, information of an amount that does not exceed the upper-limit is displayed, and the information providing apparatus 1 notifies the user terminal 2 that not all of information available is displayed in the display region after switching the type of information. In the present embodiment, a description is given on the supposition that the information switching unit 15 has the above-described notification functions. The notification functions may be included in another function unit such as the switching instruction acquiring unit 14.

The switching means providing unit 16 provides the user terminal 2 with a switching means for acquiring a switching instruction from the user terminal 2. The switching instruction acquiring unit 14 acquires a switching instruction from the user terminal 2 when the user performs the first operation on the switching means.

As described above, the switching means is a means for enabling the switching instruction to be provided when the scroll operation is performed on a display region. For example, the switching means is the first display data for displaying a scroll bar for the scroll operation in the display regions, or a control command for imparting, to a hard key of the user terminal 2, a function to scroll the display regions. Alternatively, the switching means may be the first display data for performing the swipe operation in the display regions. The switching means providing unit 16 may provide the user terminal 2 with the switching means as a part of the first display data.

The searching means providing unit 17 is configured to provide the user terminal 2 with a searching means that allows the user to set a search condition for searching for an object(s) based on the information stored in the information storage unit 11. When the user terminal 2 is provided with the first display data in which a type of information concerning objects has been switched to another, and then an operation is performed on the user terminal 2 to return from a display of the first display data to setting of a search condition, the searching means providing unit 17 provides the user terminal 2 with the searching means again. "An operation is performed to return" is to press a "RETURN" button (a soft key or a hard key) of the browser, or to operate a return button included in the second display data. The user can return the display content displayed on the display screen to a display content previously displayed. Even after the user has performed switching the type of information displayed in the display regions many times, the searching means providing unit 17 provides the searching means again when the "return" operation is performed. This facilitates the user to search for an object(s). With this configuration, the user can execute a search again without considering whether or not the type of information has been switched.

It is noted that the functions of the information storage unit 11, the first display data providing unit 12, the second display data providing unit 13, the switching instruction acquiring unit 14, the information switching unit 15, the switching means providing unit 16, and the searching means providing unit 17 included in the information providing apparatus 1 are an example of the functions of the information providing apparatus 1, and should not be construed to limit the functions of the information providing apparatus 1. For example, the information providing apparatus 1 may not include all of the above-mentioned functions, but may include a part thereof. In addition, the information providing apparatus 1 may include a function(s) as well as the above-mentioned functions. For example, the information providing apparatus 1 may include an input function for setting functions, or an output function for notifying the operation status of the apparatus by an LED lamp or the like.

It has been described above that the above-mentioned functions of the information providing apparatus 1 are realized by software. However, one or more functions among the above-mentioned functions of the information providing apparatus 1 may be realized by hardware.

In addition, any one of the above-mentioned functions of the information providing apparatus 1 may be divided into a plurality of functions for implementation. Furthermore, two or more functions among the above-mentioned functions of the information providing apparatus 1 may be integrated into one for implementation. Thus, although FIG. 1 shows the functions of the information providing apparatus 1 in the form of function blocks, it does not indicate that each of the functions is realized as an independent program file, for example.

The information providing apparatus 1 may be realized in one housing, or may be a system including a plurality of apparatuses that are connected to each other via a network or the like. The information providing apparatus 1 may be realized as a virtual apparatus such as a cloud service that provides a part or all of the functions of the information providing apparatus 1 by a cloud computing system. One or more functions among the functions of the information providing apparatus 1 may be realized by other apparatus(es). Furthermore, the information providing apparatus 1 may be a general-purpose computer such as a server apparatus, or may be a dedicated apparatus having limited functions.

Figure 2:
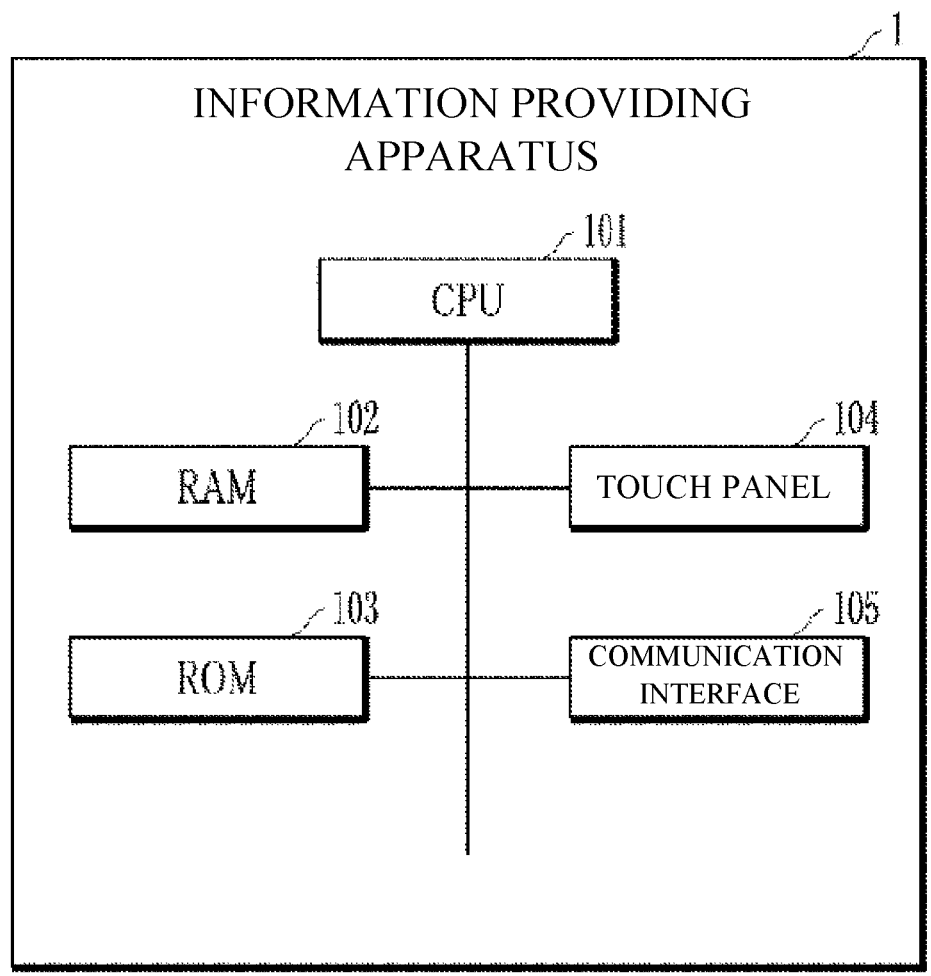
FIG. 2 is a block diagram showing an example of a hardware configuration of the information providing apparatus according to the embodiment.

Next, a hardware configuration of the information providing apparatus 1 is described with reference to FIG. 2. FIG. 2 is a block diagram showing an example of a hardware configuration of the information providing apparatus 1 in the embodiment.

The information providing apparatus 1 includes a CPU (Central Processing Unit) 101, a RAM (Random Access Memory) 102, a ROM (Read Only Memory) 103, a touch panel 104, and a communication interface 105. The information providing apparatus 1 is configured to execute an information providing program as explained with reference to FIG. 1.

The CPU 101 controls the information providing apparatus 1 by executing the information providing program stored in the RAM 102 or the ROM 103. The information providing program is obtained from, for example, a non-transitory recording medium recorded with the information providing program, or from a program distribution server via a network, is installed into the ROM 103, and is read and executed by the CPU 101.

The touch panel 104 has an operation input function and a display function (operation display function). The touch panel 104 allows the user of the information providing apparatus 1 to input an operation by using a finger tip, a touch pen or the like. Although the present embodiment describes a case where the information providing apparatus 1 uses the touch panel 104 having an operation/display function, the information providing apparatus 1 may include a display device having a display function, and an operation input device having an operation input function, individually. In that case, the display screen of the touch panel 104 can be implemented as the display screen of the display device, and an operation of the touch panel 104 can be implemented as an operation of the operation input device. The touch panel 104 can be realized in various forms such as a head-mounted display, an eyeglasses-type display, or a watch-type display, for example.

The communication interface 105 is an interface for a wireless communication. The communication interface 105 executes a short-range wireless communication such as a wireless LAN, a wired LAN, or an infrared LAN. FIG. 2 shows only one communication interface, namely, the communication interface 105. However, the information providing apparatus 1 may include a plurality of communication interfaces respectively for a plurality of communication systems.

Figure 3:
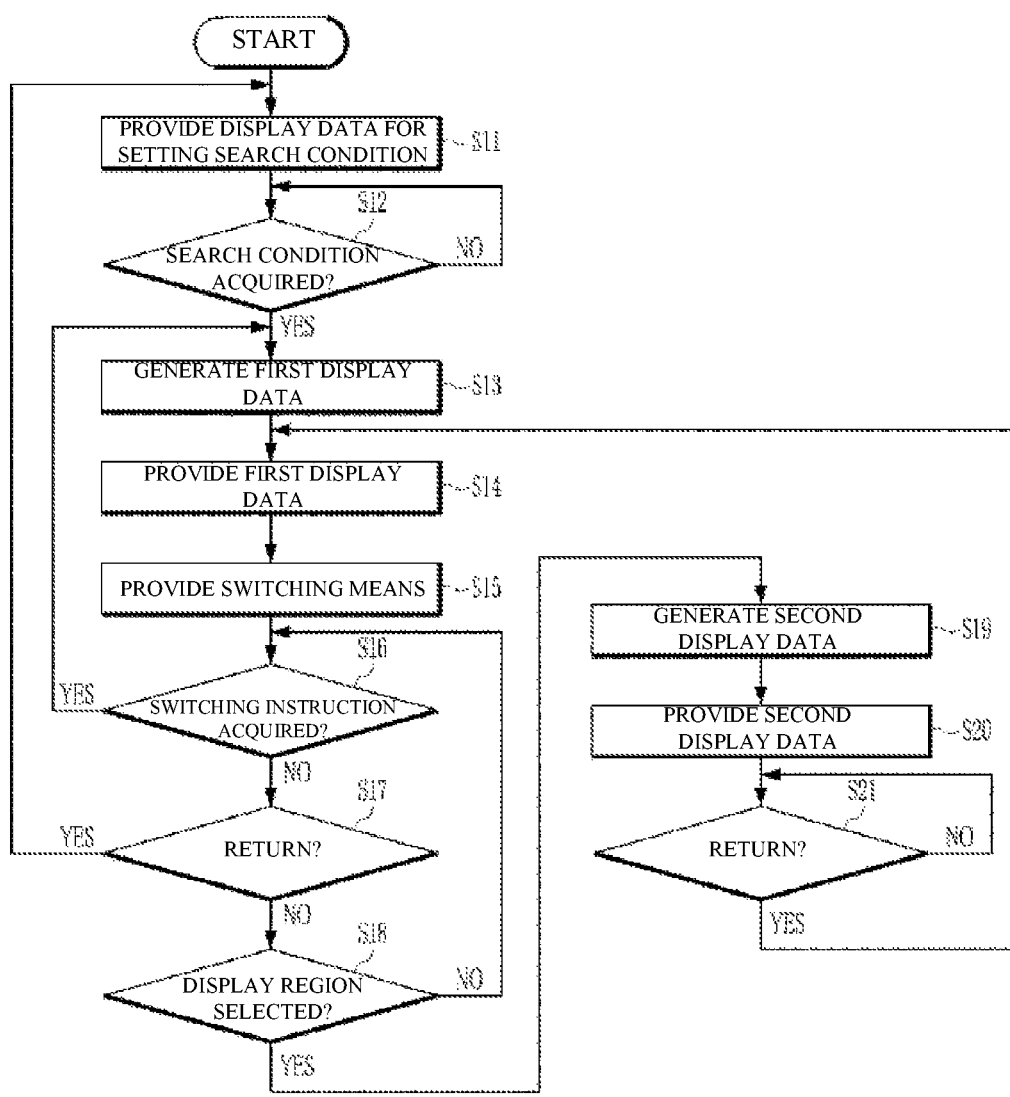
FIG. 3 is a flowchart showing an example of operation of an information providing program according to the embodiment.

Next, an operation of the information providing program is described with reference to FIG. 3. FIG. 3 is a flowchart showing an example of the operation of the information providing program in the present embodiment. In the following flowchart, the information providing apparatus 1 is described as the processing execution subject. However, each process of the steps is executed by a corresponding function among the above-mentioned functions of the information providing apparatus 1. It is noted that the present invention may be realized as a non-transitory recording medium recorded with the information providing program.

With reference to FIG. 3, the information providing apparatus 1 provides the user terminal 2 with display data for searching, as a searching means for setting a search condition (step S11). The display data for searching is provided by the searching means providing unit 17. The search condition is used to search for object(s). Upon acquiring the display data for setting a search condition, the user terminal 2 displays a search screen on the display screen so that a search condition for searching for object(s) can be input on the search screen. On the search screen, the user inputs a search condition for searching for object(s), and presses a search execution button. For example, when the object to be searched for is a restaurant, the search condition may be a genre of food such as "Japanese food", "Western-style food", or "Chinese food". The search condition may be a region in which the store is present, a use scene or purpose, a type of course, equipment or services of the store, availability of smoking, or a free keyword. The user terminal 2 provides the information providing apparatus 1 with the search condition that has been input on the search screen.

Following the execution of step S11, the information providing apparatus 1 determines whether or not it has acquired a search condition from the user terminal 2 (step S12). Upon determines that it has not acquired a search condition from the user terminal 2 (step S12: NO), the information providing apparatus 1 waits for a search condition to be acquired by repeating the process of step S12.

Upon determining that it has acquired a search condition from the user terminal 2 (step S12: YES), the information providing apparatus 1 generates first display data based on the set search condition (step S13). The first display data may be generated by searching for object(s) that satisfy the acquired search condition, extracting information concerning the object(s) to be displayed in display regions, and generating display data for displaying a list of the display regions in a predetermined order. The search of the object(s) may be performed by referring to information concerning objects stored in the information storage unit 11, and identifying an object(s) that satisfy the search condition. In a case where no search condition has been input, the information providing apparatus 1 may extract information of all objects.

The type(s) of information displayed in the display regions based on the first display data is preliminarily set (default setting). The type(s) of information set by the default setting may be set for each user, or in common with all users. In addition, the information providing apparatus 1 may preliminarily store previously displayed types of information for each user, and generate the first display data with information of the same types as the previously displayed types of information.

Following the execution of step S13, the information providing apparatus 1 provides the user terminal 2 with the first display data (step S14). This may be realized by the first display data providing unit 12 providing the first display data for arranging a plurality of display regions. The display regions are each a region in which a part of information stored in the information storage unit 11 is displayed for each object in a predetermined display shape, and may be called "cassettes". The information providing apparatus 1 is capable of improving the visibility of the information displayed in the list by unifying the type(s) of information displayed in the display regions and the shape of the display region for each of the objects.

Following the execution of step S14, the information providing apparatus 1 provides the user terminal 2 with a switching means (step S15). The switching means is an operation means for switching among a plurality of types of information displayed in the display regions, and is a button, a pull-down menu, a floating window or the like that is operably displayed on the display screen of the user terminal 2. The user operates the switching means to provide the information providing apparatus 1 with a switching instruction. It is noted that since the switching means is also a part of the display data, the information providing apparatus 1 may generate and provide first display data that includes the switching means.

Following the execution of step S15, the information providing apparatus 1 determines whether or not it has acquired a switching instruction (step S16). The determination may be made by determining whether or not the switching instruction acquiring unit 14 has acquired a switching instruction from the user terminal 2. The switching instruction is acquired when the user performs the first operation on the display regions. As described above, the first operation includes the scroll operation performed on the display regions (including the scroll operation performed in the reverse direction to return to previously displayed information) and the swipe operation (including the swipe operation performed in the reverse direction to return to previously displayed information). Upon determining that it has acquired a switching instruction (step S16: YES), the information providing apparatus 1 generates (re-generates) the first display data in which the type(s) of information displayed in the display regions has been switched to another type(s) of information in accordance with the switching instruction (step S13), provides the user terminal 2 with the first display data (step S14), and provides the user terminal 2 with the switching means (step S15). By re-generating the first display data, information of an object that the user wants to confirm is displayed in the display region. That is, when the information providing apparatus 1 determines in step S16 that it has acquired a switching instruction, the information providing apparatus 1 allows the user to make a comparison among objects by the above-described second object comparison method.

Upon determining that it has not acquired a switching instruction (step S16: NO), the information providing apparatus 1 determines whether or not a "return" operation has been performed (step S17). Upon determining that a "return" operation has been performed (step S17: YES), the information providing apparatus 1 executes the processes of step S11 and onward so that the user terminal 2 can set the search condition.

Upon determining that a "return" operation has not been performed (step S17: NO), the information providing apparatus 1 determines whether or not a display region has been selected from a plurality of display regions displayed on the user terminal 2 (step S18). A display region may be selected when the user operates (taps) the display region. Upon determining that a display region has not been selected (step S18: NO), the information providing apparatus 1 returns to step S16 to determine whether or not it has acquired a switching instruction.

Upon determining that a display region has been selected (step S18: YES), the information providing apparatus 1 generates the second display data (step S19). The second display data is used to display details of an object. The details of the object may include a part or all of information of the object stored in the information storage unit 11, or include other information.

Following the execution of step S19, the information providing apparatus 1 provides the user terminal 2 with the second display data generated in step S19 (step S20). The second display data may include a button for returning to the display based on the first display data.

Following the execution of the process of step S20, the information providing apparatus 1 determines whether or not a "return" operation has been performed (step S21). To perform the "return" operation, a "RETURN" button of the browser may be pressed, or a return button included in the second display data may be operated. Upon determining that a "return" operation has not been performed (step S21: NO), the information providing apparatus 1 waits for a "return" operation to be performed by repeating the process of step S21. Detailed information of the object is displayed on the display screen of the user terminal 2 based on the second display data until the "return" operation is performed.

Upon determining that the "return" operation has been performed (step S21: YES), the information providing apparatus 1 returns to the process of step S14, and the generated first display data (or the first display data in which the type of information has been switched to another in a case where the type of information displayed in the display region has been switched to another type of information) is provided to the user terminal 2.

It is noted that although the process of the flowchart shown in the figure is supposed to be repeated, the process may be interrupted when a process for interrupting the communication (session) is executed on the user terminal 2.

The processes performed by the information providing apparatus 1 in the steps of the present embodiment should not be construed to limit the execution order.

Next, a description is given of how information is displayed on a smartphone, an example of the user terminal 2, with reference to FIG. 4A to FIG. 7C. FIG. 4A and FIG. 4B, FIG. 5A and FIG. 5B, FIG. 6A and FIG. 6B, and FIG. 7A to FIG. 7C show examples of how information concerning objects is displayed according to the embodiment.

Figure 4A:
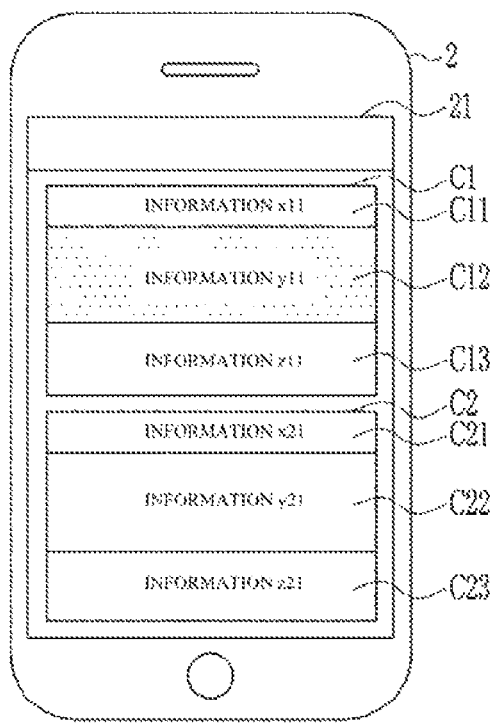
FIG. 4A and FIG. 4B are diagrams showing a first example of displaying information concerning objects according to the embodiment.
Figure 4B:
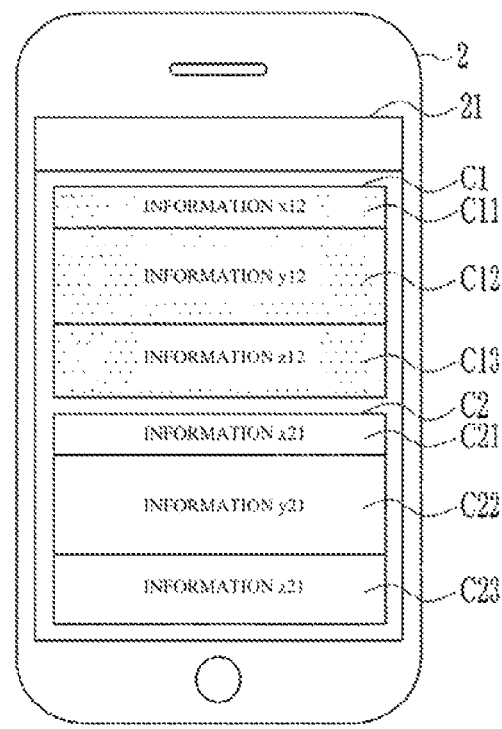

FIG. 4A and FIG. 4B show an execution mode in which when the user performs the first operation in a sub region included in one of a plurality of cassettes displayed, information displayed in a display region including the sub region is switched to another information.

FIG. 4A shows that a list 21 is displayed on a touch panel of the user terminal 2 (smartphone) based on the first display data, the list 21 being a list of display regions. In the list 21, cassettes C1 and C2 are displayed as specific examples of the display regions. By scrolling the list 21 vertically, the user can display a plurality of pieces of information concerning stores (not shown) on the user terminal 2. The cassette C1 includes a first region C11, a second region C12, and a third region C13. The cassette C2 includes a first region C21, a second region C22, and a third region C23. The first region C11 of the cassette C1 and the first region C21 of the cassette C2 display the same type of information. Similarly, the second region C12 of the cassette C1 and the second region C22 of the cassette C2 display the same type of information, and the third region C13 of the cassette C1 and the third region C23 of the cassette C2 display the same type of information. The cassettes C1 and C2 display the same types of information in the display regions and the sub regions of the same rectangular shape. Displaying the same types of information in the cassettes and sub regions of the same shape makes it possible for the user to make a comparison among information displayed in the cassettes in the list 21.

Information x11 is displayed in the first region C11. Information y11 is displayed in the second region C12. Information z11 is displayed in the third region C13. Information x21 is displayed in the first region C21. Information y21 is displayed in the second region C22. Information z21 is displayed in the third region C23.

The halftone in the second region C12 indicates that the user has performed the first operation in the second region C12. FIG. 4B shows an example of how information is displayed on the user terminal 2 when the user performs the first operation in the second region C12.

In FIG. 4B, information displayed in the first region C11 of the cassette C1 has been switched from the information x11 to information x12. Information displayed in the second region C12 has been switched from the information y11 to information y12. Furthermore, information displayed in the third region C13 has been switched from the information z11 to information z12. On the other hand, information displayed in the display region of the cassette C2 has not been switched. For example, in a case where the information y12 displayed in the second region C12 is highly related to the information x12 or the information z12, when information displayed in the first region C11 and the third region C13 is switched to other information in conjunction with the information y12, the user can confirm the information related to the information y12 all at once. This improves the usability of users.

Figure 5A:
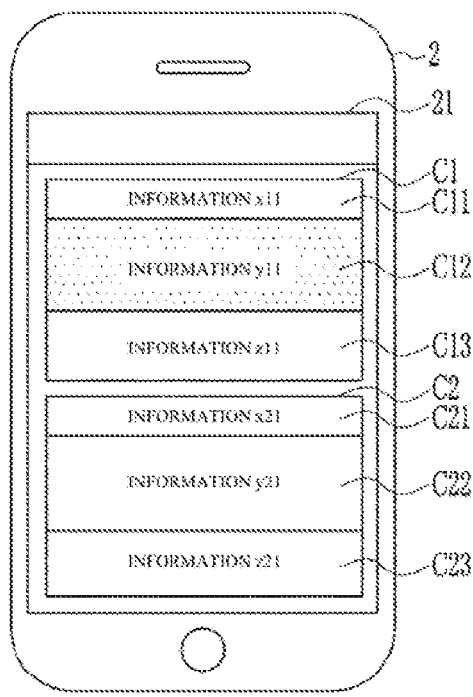
FIG. 5A and FIG. 5B are diagrams showing a second example of displaying information concerning objects according to the embodiment.
Figure 5B:
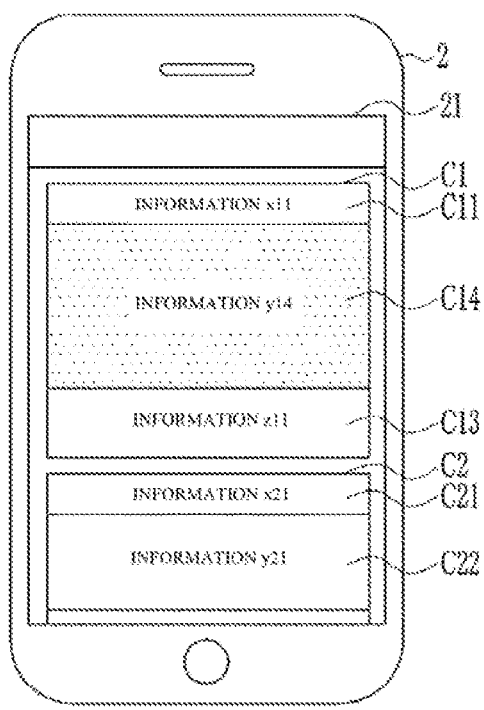

FIG. 5A and FIG. 5B show an execution mode in which when the user performs the first operation in a sub region included in one of a plurality of cassettes displayed, only information displayed in the sub region in which the first operation has been performed, is switched to another information. It is noted that FIG. 5A is the same as FIG. 4A, and description thereof is omitted.

FIG. 5B shows an example of how information is displayed on the user terminal 2 when the user performs the first operation in the second region C12. In FIG. 5B, information displayed in a second region C14 has been switched from the information y11 to information y14. The display region of the second region C14 was expanded when information displayed therein was switched from the information y11 to the information y14 while the display position of a side of the second region C14 at the border from the first region C11 was not changed. On the other hand, information displayed in the first region C11 of the cassette C1, information displayed in the third region C13, and information displayed in the cassette C2 has not been switched. For example, in a case where the information y14 displayed in the second region C14 is map information and requires a wide display region, when the sub region of the second region C14 is expanded and information is switched, the visibility of the information y14 is improved. This improves the usability of users.

Figure 6A:
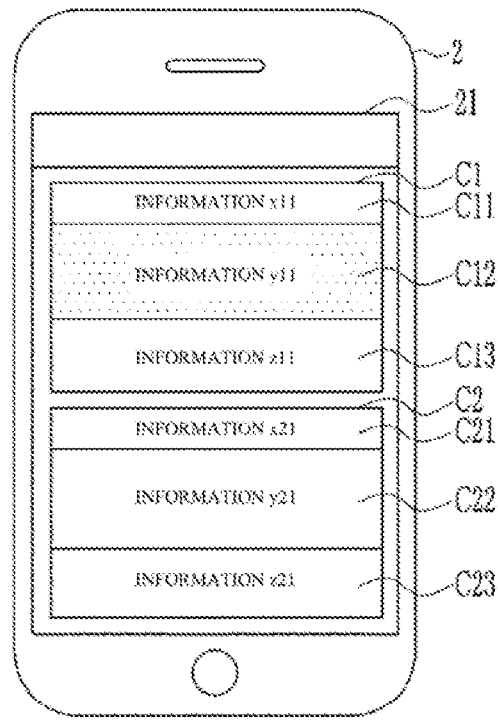
FIG. 6A and FIG. 6B are diagrams showing a third example of displaying information concerning objects according to the embodiment.
Figure 6B:
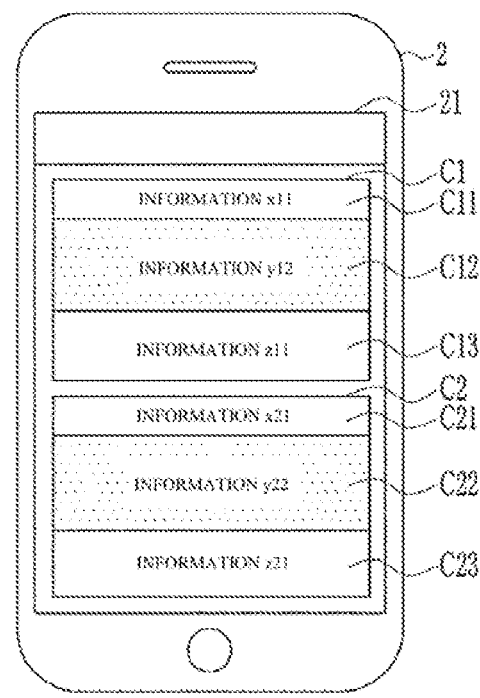

FIG. 6A and FIG. 6B show an execution mode in which when the user performs the first operation in a sub region included in one of a plurality of cassettes displayed, information is switched based on the sub region in which the first operation has been performed. It is noted that FIG. 6A is the same as FIG. 4A, and description thereof is omitted.

FIG. 6B shows an example of how information is displayed on the user terminal 2 when the user performs the first operation in the second region C12. In FIG. 6B, information displayed in the second region C12 has been switched from the information y11 to the information y12. In addition, information displayed in the second region C22 of the cassette C2 which is the same type of information as the information displayed in the second region C12, has been switched from the information y21 to the information y22. On the other hand, information displayed in the first region C11 and the third region C13 of the cassette C1, and information displayed in the first region C21 and the third region C23 of the cassette C2 has not been switched. In this way, the same type of information displayed in a plurality of cassettes is switched all at once. This allows the user to confirm information in a plurality of cassettes in a list, thereby improving the usability of users.

Figure 7A:
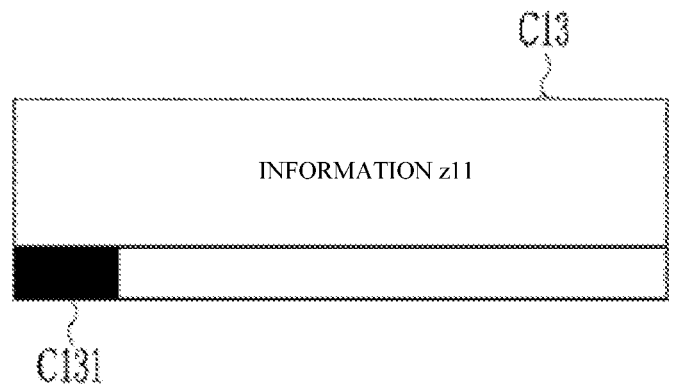
FIG. 7A to FIG. 7C are diagrams showing a fourth example of displaying information concerning objects according to the embodiment.
Figure 7B:
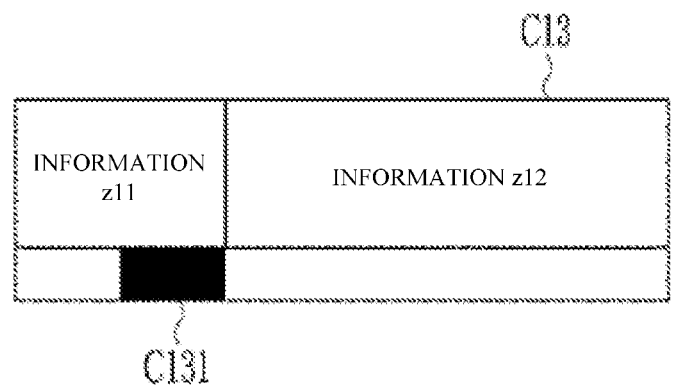
Figure 7C:
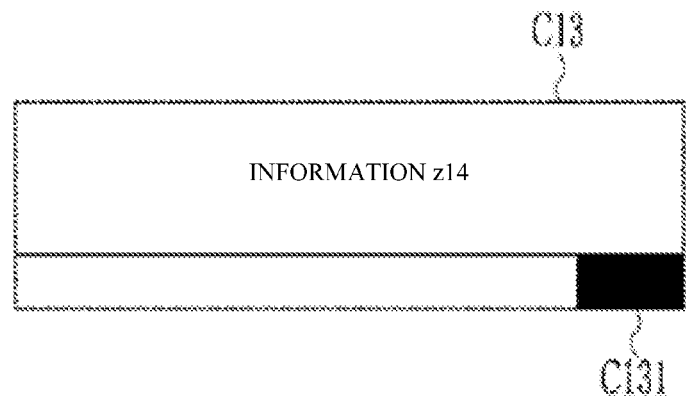

FIG. 7A to FIG. 7C show an execution mode in which displayed information is switched based on a scroll operation performed on the display regions. The third region C13 shown in FIG. 7A and FIG. 7B is a sub region of the cassette C1.

With reference to FIG. 7A, the third region C13 includes a scroll bar C131. The scroll bar C131 is located at the left end of the third region C13 in FIG. 7A, and the information z11 is displayed in the third region C13.

With reference to FIG. 7B, when the user performs the scroll operation on the scroll bar C131 to scroll it rightward in FIG. 7B, information displayed in the third region C13 gradually switches from the information z11 to the information z12 in correspondence with the position of the scroll bar C131.

With reference to FIG. 7C, when the user performs the scroll operation on the scroll bar C131 to scroll it to the right end of the third region C13 in FIG. 7C, the information displayed in the third region C13 switches to information z14 that is the last information to be displayed in the third region C13.

It is noted that when the user performs the scroll operation on the scroll bar C131 to scroll it leftward in FIG. 7A to FIG. 7C, the information displayed in the third region C13 gradually returns to previously displayed information. In addition, although FIG. 7A to FIG. 7C show an example of the scroll operation for which the scroll bar C131 is used, the scroll operation may be realized by operation of a hard key such as a volume key provided on the user terminal 2.

A program for realizing the functions of the apparatus described in the present embodiment may be recorded on a non-transitory computer-readable recording medium, and the program may be read into a computer system from the recording medium such that the above-described processes of the present embodiment are executed as the program is executed in the computer system. It is noted that the "computer system" mentioned here may include an OS (operating system) and hardware such as peripheral devices. Furthermore, in a case where a www system is used, the "computer system" may include a homepage provision environment (or display environment). In addition, the "non-transitory computer-readable recording medium" refers to a flexible disk, a magneto-optical disk, a ROM, a writable non-volatile memory such as a flash memory, a portable medium such as a CD-ROM, a storage device embedded in a computer system such as a hard disk, or the like.

The "non-transitory computer-readable recording medium" includes a recording medium that holds a program for a predetermined time period, such as a volatile memory (e.g., DRAM: Dynamic Random Access Memory) that is provided in the inside of a computer system and works as a server or a client in a case where a program is transmitted via a network such as the Internet or a communication line such as a telephone line. In addition, the above-mentioned program may be transmitted from the computer system having a storage device in which the program is stored, to another computer system via a transmission medium or a transmission wave in the transmission medium. Here, the "transmission medium" for transmitting the program refers to a medium having a function to transmit information, such as a network (communication network) such as the Internet, or a communication line such as a telephone line. In addition, the program may realize a part of the above-mentioned functions. Furthermore, the program may be a so-called differential file (differential program) that realizes the above-mentioned functions in combination with a program that has been recorded in the computer system.

An embodiment of the present invention is described above with reference to the accompanying drawings. However, the present invention should not be construed to be limited to such a specific configuration, but may include many modifications and variations without deviating from the scope of the present invention.

What is claimed is:

1. An apparatus comprising:
   at least one memory configured to store computer program code; and
   at least one processor configured to access the at least one memory and operate according to the computer program code to:
   store a plurality of pieces of information concerning a plurality of objects;
   provide first display data for arranging and displaying a plurality of display regions on a display screen of a user terminal in a predetermined display shape respectively, each display region corresponding to a respective one of the plurality of objects such that a part of the stored pieces of information concerning the object is displayed in the corresponding one of the plurality of display regions;
   acquire a switching instruction that indicates a first operation performed on one of the display regions displayed on the display screen of the user terminal; and
   in response to the switching instruction being acquired, switch information displayed in the one of the display regions to another piece of information while maintaining the information displayed in remaining display regions, based on the first display data,
   wherein:
   the first display data for includes dividing data for dividing each of the plurality of display regions into a plurality of sub regions for display, each sub region displaying a different type of information of the stored pieces of information concerning the object corresponding to the display region; and
   when the information displayed in a sub region of the one of the display regions is switched based on the first operation being performed in the sub region, information in a corresponding sub region of the other display regions is switched, while maintaining information displayed in remaining sub regions of the display regions.

2. The apparatus according to claim 1, wherein the first operation is a scroll operation.

3. The apparatus according to claim 1, wherein the first operation is a swipe operation.

4. The apparatus according to claim 1, wherein:
   the information displayed in the one of the display regions is switched based on the sub region of the one of the display regions in which the first operation has been performed.

5. The apparatus according to claim 1, wherein the at least one processor accesses the at least one memory and operates according to the computer program code to further:
   in response to receiving an instruction indicating that a second operation is performed in a display region among the plurality of display regions displayed on the display screen, provide second display data for displaying detailed information of the object corresponding to the display region in which the second operation has been performed.

6. The apparatus according to claim 5, wherein the display region in which the second operation has been performed is the one of the display regions.

7. The apparatus according to claim 1, wherein information is switched while maintaining a shape of each of the display regions.

8. The apparatus according to claim 1, wherein the information is switched while continuing to display the display regions on the display screen.

9. The apparatus according to claim 1, wherein the at least one processor accesses the at least one memory and operates according to the computer program code to further:
   change a shape of each of the display regions displayed on the display screen of the user terminal while fixing a position of a part of each of the display regions, and switch the information displayed in the one of the display regions.

10. The apparatus according to claim 1, wherein the at least one processor accesses the at least one memory and operates according to the computer program code to further:
- change a shape of each of the display regions that are scrollably displayed on the display screen of the user terminal, while fixing a scroll position on the display regions, and
- switch the information displayed in the one of the display regions.

11. The apparatus according to claim 1, wherein the at least one processor accesses the at least one memory and operates according to the computer program code to further:
- notify the user terminal that not all of information available is displayed in the display regions.

12. A method comprising:
- storing a plurality of pieces of information concerning a plurality of objects;
- providing first display data for arranging and displaying a plurality of display regions on a display screen of a user terminal in a predetermined display shape respectively, each display region corresponding to a respective one of the plurality of objects such that a part of the stored pieces of information concerning the object is displayed in the corresponding one of the plurality of display regions;
- acquiring a switching instruction that indicates a first operation performed on one of the display regions displayed on the display screen of the user terminal; and
- in response to the switching instruction being acquired, switch information displayed in the one of the display regions to another piece of information while maintaining the information displayed in remaining display regions, based on the first display data, wherein:
- the first display data for includes dividing data for dividing each of the plurality of display regions into a plurality of sub regions for display, each sub region displaying a different type of information of the stored pieces of information concerning the object corresponding to the display region; and
- when the information displayed in a sub region of the one of the display regions is switched based on the first operation being performed in the sub region, information in a corresponding sub region of the other display regions is switched, while maintaining information displayed in remaining sub regions of the display regions.

13. A non-transitory computer readable storage medium storing an information providing program which, when executed by at least one processor, causes the at least one processor to:
- store a plurality of pieces of information concerning a plurality of objects;
- provide first display data for arranging and displaying a plurality of display regions on a display screen of a user terminal in a predetermined display shape respectively, each display region corresponding to a respective one of the plurality of objects such that a part of the stored pieces of information concerning the object is displayed in the corresponding one of the plurality of display regions;
- acquire a switching instruction that indicates a first operation performed on one of the display regions displayed on the display screen of the user terminal; and
- in response to the switching instruction being acquired, switch information displayed in the one of the display regions to another piece of information while maintaining the information displayed in remaining display regions, based on the first display data, wherein:
- the first display data for includes dividing data for dividing each of the plurality of display regions into a plurality of sub regions for display, each sub region displaying a different type of information of the stored pieces of information concerning the object corresponding to the display region; and
- when the information displayed in a sub region of the one of the display regions is switched based on the first operation being performed in the sub region, information in a corresponding sub region of the other display regions is switched, while maintaining information displayed in remaining sub regions of the display regions.

14. A non-transitory computer readable storage medium storing a user terminal control program for a user terminal which, when executed by at least one processor of the user terminal, causes the at least one processor to:
- acquire, from a server, first display data for displaying a plurality of display regions in a predetermined display shape respectively, each display region corresponding to a respective one of a plurality of objects such that a part of a plurality of pieces of information concerning the plurality of objects concerning the object is displayed in the corresponding one of the plurality of display regions;
- arrange and display the plurality of display regions on a display screen of the user terminal based on the acquired first display data;
- receive a first operation from a user on one of the plurality of display regions;
- provide the server with a switching instruction indicating the first operation and the one of the plurality of display regions;
- receiving, from the server, second display data for switching the information displayed in the one of the display regions to another piece of information; and
- switching the information displayed in the one of the display regions to the another piece of information while maintaining the information displayed in remaining display regions, based on the second display data, wherein:
- the first display data for includes dividing data for dividing each of the plurality of display regions into a plurality of sub regions for display, each sub region displaying a different type of information of the stored pieces of information concerning the object corresponding to the display region; and
- when the information displayed in a sub region of the one of the display regions is switched based on the first operation being performed in the sub region, information in a corresponding sub region of the other display regions is switched, while maintaining information displayed in remaining sub regions of the display regions.

15. The non-transitory computer readable storage medium according to claim 14, wherein the first operation is one of a scroll operation and a swipe operation.

16. The non-transitory computer readable storage medium according to claim 14, wherein:
- the server is provided with the switching instruction indicating the first operation, and the sub region of the one of the display regions in which the first operation was performed.

17. The apparatus of according to claim 1, wherein the plurality of objects comprise stores, and
   wherein the first display data is for arranging and displaying the plurality of display regions in a list on the display screen of the user terminal.

18. The apparatus according to claim 1, wherein the first display data is for arranging and displaying the plurality of display regions in a list on the display screen of the user terminal.

\* \* \* \* \*